3,197,309
TRANSFORMATION OF ALGAE TO A HUMAN NUTRIENT
David D. Chapman, Seattle, Gerald M. Christensen and Arthur J. Pilgrim, Bellevue, Joseph A. Stern, Bothell, and Irena Zommers, Seattle, Wash., assignors to The Boeing Company, Seattle, Wash., a corporation of Delaware
No Drawing. Filed Jan. 23, 1962, Ser. No. 168,230
11 Claims. (Cl. 99—1)

This invention relates to an algae nutrient and the process for making such a nutrient. More particularly this process relates to means for making unicellular algae suitable as a nutrient for human consumption by bleaching the algae and adding nutritionally valuable ingredients therein.

Green algae contains many of the nutritionally valuable substances needed for human consumption. It is readily available and hence could supply an answer to the world's continually increasing need for food. Such algae would also appear to be a good source of oxygen and food for space travel. However, despite its basically suitable characteristics as a nutrient, algae has not been acceptable as a human foodstuff. This has been due to the fact that people generally consider it to be unpalatable due to its appearance, taste, and odor. The special application of the algae as a long-term subsistence diet of highly-colored green foods could produce a profound adverse psychologic affect on man. Also, the green algae have a tendency to turn rancid when stored which further limits its value as a food. It has been found that the use of green algae incorporated into various foodstuffs does tint the resulting foodstuff a greenish color and is so hygroscopic that the texture of the resulting cooked products containing algae is poor.

Attempts have been made to chemically bleach the algae so as to give it a more palatable taste and appearance. However, the chemicals used for bleaching have had a tendency to detrimentally affect the nutritional value of the algae. Furthermore, chemically bleached algae have been found to be unfit for human consumption due to rancidity of the fat contained therein. Moreover, when non-chemical means have been used to effect bleaching, the decolorization has not been permanent in some cases and in other cases has resulted in degradation of the cellular structure of the algae resulting in a product with poor nutritional quality and poor storage life.

Accordingly, it is a principal object of our invention to permanently bleach an algae nutrient without substantially deteriorating the nutritional qualities of the algae.

It is a further object of our invention to provide a bleached algae nutrient which has an appearance, taste, texture, and odor that makes it palatable.

Another object of our invention is to develop an algae food which contains substantially all the basic nutritional ingredients required for human subsistence.

A still further object is to provide a method for utilizing algae as a major constituent in therapeutic diets.

Other objects and advantages will appear from the following description and claims.

The means by which we can produce an algae foodstuff with these many desirable attributes may be described generally as exposing a culture of algae in the absence of carbon dioxide to an intense white light until the desired bleaching effect has been achieved. Additionally, in the practical application of this process the algae are suspended in a suitable medium while it is being processed and is separated from the medium when it is deemed ready for utilization as a nutrient.

The algae with which we have been concerned are of the unicellular photosynthetic type wherein the green color is due primarily to chlorophylls $a$ and $b$. These complex magnesium-containing porphyrins are degraded when the algae are exposed to intense light in the absence of carbon dioxide wherein the atmosphere has a slightly elevated oxygen tension. The light mediated decoloring may be reversible or it may be carried to the point of irreversibility. Upon exhaustion or exclusion of carbon dioxide from the medium, an algae culture exposed to intense light shows a slowly increasing rate of oxygen uptake. As endogenous oxidation progresses, the rate of uptake continues to increase rapidly and may reach a level several times higher than that due to normal respiration. During this period the destruction of the chlorophyll begins. The degradation may be observed by the progressive fading of the absorption bands of the pigment. From an examination of the time sequence of oxygen uptake and chlorophyll degradation, it is apparent that some easily oxidized cell components are destroyed before chyorophyll breakdown begins. However, it is felt that these changes are not of sufficient magnitude to affect the nutritional quality of the cells materially.

The general process for decoloring algae involves exposure to intense light for 2 to 24 hours, depending on the concentration of the suspension and the medium. We have found that it is desirable to use artificial lights in excess of 2000 foot-candles intensity. Light of greater intensity will tend to shorten the time necessary for exposure to attain the desired decolorization of the algae. Undesirable formations of bacteria tend to develop in the algae as the length of the decolorization period increases which, accordingly, would normally make a short time for decolorization preferable. We usually concentrate the cultures before decoloring to obviate the necessity for handling large volumes of suspension. The temperature during the decoloring is normally maintained below 100° F. and the pH is maintained at a slightly alkaline level to accelerate the decoloring process. Of special importance is the exclusion of carbon dioxide during decoloring. The algae suspended in the liquid medium should be agitated by stirring, by aeration devoid of carbon dioxide, or by other suitable means. Decolorization is considered attained when the suspension is completely cream colored or white and there is no evidence of any green color. Thereafter, the algae cells and solution are separated by suitable means, such as centrifugation. Such a separation process results in the algae being concentrated in the form of a paste. This paste may then be dried and ground so as to produce a flour which may be used in a variety of foods.

As a more particular example of a method to produce an algae nutrient it was found suitable to age a culture of unicellular green algae of the Chlorella species for 72 to 96 hours. Thereafter, the supply of reducible carbon is removed from the medium and the pH of the culture is adjusted by the addition of alkali until it is in the range of from 8.0 to 8.5. Agitation is achieved by introducing gaseous oxygen devoid of carbon dioxide. The decolorizing is accomplished by exposure of the culture to artificial white light at an intensity in excess of 5000 foot candles. After 8 to 16 hours under these conditions the chlorophyll and chorophyll-like compounds are destroyed and the product is collected, preferably by centrifugation. We used lyophilization to dry the algae although any appropriate means would be suitable. This process yields a fluffy white or light tan powder of bland flavor and odor which may be used directly as a food or food supplement.

In addition to the basic treatment process whereby the algae are made platable the algae may be treated so as to include additional nutrients. Analyses of the unicellular algae have disclosed a wide variation in the nutrient content among the various species tested. The content, for instance, of proteins varied from 4 to 85 percent of the dry weight. Fat content varied from 5 to 85 percent of the dry weight, and a variation of 5 to 38 percent dry weight in the amount of carbohydrates was discovered. There are indications that such variations are related to differences in age and growth medium. The lipids are highly unsaturated and contain appreciable quantities of the triply unsaturated $C_{16}$ and $C_{18}$ acids. With aging of the culture, a marked accumulation of the lipids is seen, which is accompanied by a progressive decrease in the proportion of unsaturated fats. Of the vitamins required by man, only a few are absent in the algae. Those present incldue A, C, D, $B_1$, $B_2$, $B_6$, $B_{12}$, E, chlorine, K, and biotin. Paper chromatography of hydrolysates has shown that most of the commonly occurring amino acids are present but the compound methionine, which is essential to man, is either absent or present only in small quantities.

It follows therefore, that, in order to utilize unicellular algae as a food, the content of the particular constituents desired can be obtained by control of the aging process and the growth medium. As a particular example of the manner in which certain of the ingredients of the resulting algae can be changed we grew a *Chlorella pyrenoidosa* culture in the presence of thiourea at a level approximately 10 percent of the routinely use nitrogen source, urea. Whereas normally the sulfur containing amino acid content is such that algae will not meet human nutritional requirements, the product resulting when algae is treated with thiourea contains sufficient sulfur amino acids so that the National Research Council recommended allowance is provided by the daily consumption of about 200 grams of the dry cell mass. In a like manner other nutrients may be incorporated into the algae.

This control over the chemical composition of algae involves variation in the medium and the state of growth at the time of harvest. The variation in control of fat, protein, and carbohydrate may involve depletion or accumulation of one or more components. These differences may be attributed to the accumulation of carbon and nitrogen that may continue even though active cell division ceases. For example, cells harvested during the exponential growth phase are found to have a higher protein content than those examined in the period after the logarithmic growth phase. Conversely, the carbohydrate content of Chlorella is higher during the stationary phase than during logarithmic growth and the same is essentially true of lipids. These controllable variables may be used to produce an algae food for varying metabolic requirements in a similar manner to the particular examples heretofore described. These particular embodiments previously described are not meant to be limitations to our invention but rather exemplicative of the general processes in practical applications with which we are concerned.

We claim:
1. A process for making algae suitable for human consumption comprising the exposure of Chlorella algae suspended in an alkaline liquid medium in the absence of carbon dioxide to intense white light until substantial bleaching of the algae has been effected.

2. A process for making algae suitable for human consumption comprising exposing unicellular chlorophyll containing Chlorella algae suspended in an alkaline liquid medium in the absence of carbon dioxide to white light with intensity in excess of 2000 foot-candles until substantial bleaching of the algae has been effected.

3. A process for making an algae nutriment comprising the steps of removing carbon dioxide from a culture of chlorella algae and subjecting the algae culture to white light in excess of 2000 foot candles intensity until substantially all the chlorophyll has been destroyed in the algae culture.

4. A process for making an algae nutriment comprising growing a Chlorella algae culture in a liquid medium, exposing the algae culture in the absence of carbon dioxide to light with an intensity in excess of 2000 foot-candles until the green color has been bleached from the algae, agitation of the algae culture during said exposure, and separation of the algae cells from the solution after said bleaching is completed.

5. A process for making an algae nutriment comprising growing a unicellular chlorophyll containing chlorella algae in a liquid medium, adding to the growing algae a substance which is an organic sulfur source and which combines with the algae to form nutrients, exposing the algae culture in the absence of carbon dioxide to an intense white light until the chlorophyll in the algae has been destroyed, substantially continuously agitating the culture during the process, and separating the algae from the medium.

6. A process as in claim 5 wherein the organic sulfur source is thiourea.

7. A process for making an algae nutriment comprising the steps of aging a culture of unicellular chlorophyll containing Chlorella algae, removing the reducible carbon therefrom, mixing gaseous oxygen into the algae culture, exposing the algae to artificial white light at an intensity in excess of 5000 foot-candles until the chlorophyll contained in the algae has been destroyed, and separating the algae from the liquid medium.

8. A process for making an algae nutriment comprising the steps of aging a culture of unicellular chlorophyll containing Chlorella algae for 72 to 96 hours in a liquid medium, removing reducible carbon from the algae culture, agitating the culture with the injection of gaseous oxygen, exposing the algae to white light at an intensity in excess of 5000 foot-candles for 8 to 16 hours, and separating the algae from the liquid medium.

9. A process for making an algae nutriment comprising the steps of aging a culture of unicellular chlorophyll containing Chlorella algae for 72 to 96 hours in a liquid medium, adding, to the growing algae, a substance which is an organic sulfur containing source which combines with the algae to form nutrients, removing reducible carbon from the algae culture, mixing gaseous oxygen into the algae culture, exposing the algae to white light at an intensity in excess of 5000 foot-candles until the chlorophyll in the algae has been destroyed, and separating the algae from the liquid medium.

10. A process for making an algae nutriment as in claim 9 wherein the organic sulfur source is thiourea.

11. A process for making an algae nutriment suitable for human consumption comprising the steps of adding thiourea to a growing algae culture to form nutrients and exposing the algae culture to intense white light in the absence of carbon dioxide until the chlorophyll contained therein has been substantially destroyed.

References Cited by the Examiner

West et al.: Textbook of Biochemistry, The MacMillan Company, New York, June 1961, pages 1000–1005.

Hill: Advances in Enzymology, Interscience Publishers, Inc., New York, 1951, pages 1–39.

A. LOUIS MONACELL, *Primary Examiner.*

ABRAHAM H. WINKELSTEIN, *Examiner.*